(12) United States Patent
Angkititrakul et al.

(10) Patent No.: US 10,431,207 B2
(45) Date of Patent: Oct. 1, 2019

(54) METHODS AND SYSTEMS FOR INTENT DETECTION AND SLOT FILLING IN SPOKEN DIALOGUE SYSTEMS

(71) Applicant: Robert Bosch GmbH, Stuttgart (DE)

(72) Inventors: Pongtep Angkititrakul, Union City, CA (US); Raphael Schumann, München (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/962,900

(22) Filed: Apr. 25, 2018

(65) Prior Publication Data

US 2019/0244603 A1    Aug. 8, 2019

Related U.S. Application Data

(60) Provisional application No. 62/626,886, filed on Feb. 6, 2018.

(51) Int. Cl.
*G10L 15/16* (2006.01)
*G10L 15/18* (2013.01)
*G10L 15/22* (2006.01)

(52) U.S. Cl.
CPC .......... *G10L 15/16* (2013.01); *G10L 15/1815* (2013.01); *G10L 15/22* (2013.01)

(58) Field of Classification Search
CPC ..... G10L 15/16; G10L 15/22; G10L 15/1815; G10L 15/18; G06F 16/243;
(Continued)

(56) References Cited

U.S. PATENT DOCUMENTS 8,775,341 B1 *  7/2014  Commons ............ G06N 3/0454
                                                706/20
9,607,616 B2     3/2017  Watanabe et al.
(Continued)

FOREIGN PATENT DOCUMENTS

WO    2017092380 A1    6/2017
WO    2017210613 A1    12/2017

OTHER PUBLICATIONS

Haffner, P. et al., "Optimizing svms for complex call classification," in Acoustics, Speech, and Signal Processing, 2003. Proceedings(ICASSP'03). 2003 IEEE International Conference on, Apr. 2003, vol. 1, pp. I-632-I-635 vol. 1.
(Continued)

*Primary Examiner* — Andrew C Flanders
(74) *Attorney, Agent, or Firm* — Maginot Moore & Beck LLP

(57) ABSTRACT

A method for spoken language understanding (SLU) includes generating a first encoded representation of words from a user based on an output of a recurrent neural network (RNN), generating an intent label corresponding to the words based on an output of a first RNN decoder based on the first encoded representation, generating a corrected plurality of words based on an output of a second RNN decoder based on the first encoded representation and the intent label, generating a second encoded representation corresponding to the plurality of corrected words using the RNN encoder based on the plurality of corrected words, and generating a machine-readable dialog phrase that includes at least one word in the plurality of corrected words assigned to at least one slot based on an output of a third RNN decoder based on the second encoded representation of the plurality of corrected words and the intent label.

16 Claims, 5 Drawing Sheets

(58) Field of Classification Search
CPC ........... G06F 16/24522; G06F 16/3344; G06F 17/21; G06F 17/27; G06F 17/2715; G06F 17/2785; G06F 17/2809
See application file for complete search history.

(56) References Cited

U.S. PATENT DOCUMENTS

| | | | |
|---|---|---|---|
| 9,679,558 | B2 | 6/2017 | Akbacak et al. |
| 9,842,106 | B2 | 12/2017 | Hori et al. |
| 9,911,413 | B1* | 3/2018 | Kumar ............... G10L 15/1815 |
| 10,121,467 | B1* | 11/2018 | Gandhe ............... G10L 15/197 |
| 2012/0290290 | A1 | 11/2012 | Tur et al. |
| 2014/0236578 | A1* | 8/2014 | Malon ................ G06F 17/28 704/9 |
| 2015/0066496 | A1 | 3/2015 | Deoras et al. |
| 2016/0307566 | A1* | 10/2016 | Bellegarda .......... G06F 17/2785 |
| 2017/0011738 | A1* | 1/2017 | Senior ................. G10L 15/063 |
| 2017/0053646 | A1 | 2/2017 | Watanabe et al. |
| 2017/0278514 | A1 | 9/2017 | Mathias et al. |
| 2017/0372199 | A1 | 12/2017 | Hakkani-Tur et al. |
| 2018/0012251 | A1 | 1/2018 | Du et al. |
| 2018/0018558 | A1 | 1/2018 | Lee et al. |
| 2018/0046614 | A1* | 2/2018 | Ushio ................. G06F 17/2755 |
| 2018/0113854 | A1* | 4/2018 | Vig ..................... G06F 17/277 |
| 2018/0121796 | A1* | 5/2018 | Deisher ............... G06N 3/063 |
| 2018/0137854 | A1* | 5/2018 | Perez .................. G10L 15/16 |
| 2018/0157638 | A1* | 6/2018 | Li ....................... G06F 17/279 |
| 2018/0232662 | A1* | 8/2018 | Solomon ............ G06K 9/00362 |
| 2018/0268806 | A1* | 9/2018 | Chun .................. G10L 13/047 |
| 2018/0276525 | A1 | 9/2018 | Jiang et al. |
| 2018/0336183 | A1* | 11/2018 | Lee ..................... G06F 17/2785 |
| 2019/0012371 | A1* | 1/2019 | Campbell ........... G10L 15/1822 |
| 2019/0057683 | A1* | 2/2019 | Sak .................... G10L 15/16 |
| 2019/0073353 | A1* | 3/2019 | Yu ...................... G10L 21/055 |

OTHER PUBLICATIONS

Lafferty, John D., et al., "Conditional random fields: Probabilistic models for segmenting and labeling sequence data," in Proceedings of the Eighteenth International Conference on Machine Learning, San Francisco, CA, USA, 2001, ICML '01, pp. 282-289,Morgan Kaufmann Publishers Inc.

Mesnil, G et al., "Using recurrent neural networks for slot filling in spoken language understanding," IEEE/ACM Transactions on Audio, Speech, and Language Processing, vol. 23, No. 3, pp. 530-539, Mar. 2015.

Guo, D et al., "Joint semantic utterance classification and slot filling with recursive neural networks," in 2014 IEEE Spoken Language Technology Workshop (SLT), Dec. 2014, pp. 554-559.

Xu, P. et al., "Convolutional neural network based triangular crf for joint intent detection and slot filling," in 2013 IEEE Workshop on Automatic Speech Recognition and Understanding, Dec. 2013, pp. 78-83.

Liu, Bing et al., "Attention-based recurrent neural network models for joint intent detection and slot filling," INTERSPEECH 2016, pp. 685-689.

Bahdanau, Dzmitry et al., "Neural machine translation by jointly learning to align and translate," Cornell University Library, vol. abs/1409.0473, 2014.

Chorowski, Jan et al., "Attentionbased models for speech recognition," Cornell University Library, vol. abs/1506.07503, 2015.

Wang, Feng et al., "Survey on the attention based RNN model and its applications in computer vision," Cornell University Library, vol. abs/1601.06823, 2016.

Cho, Kyunghyun et al., "Learning phrase representations using RNN encoder-decoder for statistical machine translation," Cornell University Library, vol abs/1406.1078, 2014.

Sutskever, Ilya et al., "Sequence to sequence learning with neural networks," Cornell University Library, vol. abs/1409.3215, 2014.

Nallapati, Ramesh et al., "Sequence-to-sequence mns for text summarization," ICLR 2016 (4 pages).

Tan, Tien-Ping et al., "Evaluating LSTM Networks, Hmm and WFST in Malay Part-of-Speech Tagging," JTEC, vol. 9, pp. 79-83, 2017.

Luong, Minh-Thang et al., "Effective approaches to attention-based neural machine translation," Cornell University Library, vol. abs/1508.04025, 2015.

Bengio, Samy et al., "Scheduled Sampling for Sequence Prediction with Recurrent Neural Networks," Cornell University Library, vol. abs/1506.03099, 2015.

Hochreiter, Sepp et al., "Long Short-Term Memory," Neural Computation, vol. 9, No. 8, pp. 1735-1780, Nov. 1997.

Kingma, Diederik P. et al., "Adam: A Method for Stochastic Optimization," Cornell University Library, vol. abs/1412.6980, 2014.

Tjong, Erik F. et al., "Introduction to the CoNLL-2000 Shared Task: Chunking," in Proceedings of the CoNLL-2000 and LLL-2000, pp. 127-132, Lisbon, Portugal, 2000.

Ramshaw et al., "Text Chunking using Transformation-Based Learning," Cornell University Library, vol. cmp-lg/9505040, 1995.

Zhou, Peng et al., "Attention-Based Bidirectional Long Short-Term Memory Networks for Relation Classification," Proceedings of the 54th Annual Meeting of the Association for Computational Linguistics, pp. 207-212, Berlin, Germany, Aug. 7-12, 2016.

Brownlee, Jason, "Encoder-Decoder Recurrent Neural Network Models for Neural Machine Translation," Natural Language Processing, Jan. 1, 2018, retrieved from internet: https://machinelearningmastery.com/encoder-decoder-recurrent-neural-network-models-neural-machine-translation/.

Brownlee, Jason, "How Does Attention Work in Encoder-Decoder Recurrent Neural Networks," Natural Language Processing, Oct. 13, 2017, retrieved from internet: https://machinelearningmastery.com/how-does-attention-work-in-encoder-decoder-recurrent-neural-networks/.

International Search Report corresponding to International Patent Application No. PCT/EP2019/052472 (5 pages).

* cited by examiner

METHODS AND SYSTEMS FOR INTENT DETECTION AND SLOT FILLING IN SPOKEN DIALOGUE SYSTEMS

CLAIM OF PRIORITY

This application claims the benefit of U.S. Provisional Application No. 62/626,886, which is entitled "Methods and Systems for Intent Detection and Slot Filling in Spoken Dialogue Systems," and was filed on Feb. 6, 2018, the entire contents of which are expressly incorporated herein by reference.

FIELD

This disclosure relates generally to the field of automated spoken language understanding and, more specifically, to systems and methods for correcting and updating input text for slot-filling in spoken language understanding system.

BACKGROUND

Unless otherwise indicated herein, the materials described in this section are not prior art to the claims in this application and are not admitted to the prior art by inclusion in this section.

Spoken Language Understanding (SLU) systems process language expressed by human speech into a semantic representation understandable by the machines. SLU is the key component of all conversational AI systems. The general tasks of SLU involve intent determination and slot filling from an utterance. The intent determination task can be considered as a semantic utterance classification problem, while the slot filling task can be tackled as a sequence labeling problem of contiguous words. Previous approaches to solving these two related tasks were typically proposed as two separated systems such as Support Vector Machines (SVMs) for intent determination and Conditional Random Fields (CRFs) for slot filling.

Recent advances in neural networks, especially recurrent neural networks (RNNs), allow joint training model of both intent determination and slot filling. This framework showed advantages over the previous state-of-the-art techniques, and has gained much attention in research community. The success of joint models is contributed by the attention mechanism and the encoder-decoder model. The attention mechanism allows optimize selection of input sequence for decoding for both content and location information.

In general, an SLU system is deployed as a downstream task of spoken dialogue systems where its inputs are outputs from the front-end Automatic Speech Recognition (ASR) engine. The errors in word sequences generated by ASR engine cause the performance degradation of intent detection and slot filling. In most real-world applications (e.g., far field with noises and reverberation effect), such errors are still unavoidable even with deployment of more robust ASR techniques.

The real-world performance of slot filling and intent detection task generally degrades due to transcription errors generated by speech recognition engine. The insertion, deletion, and mis-recognition errors from speech recognizer's front-end cause the misinterpretation and misalignment of the language understanding models. Various error sources including, but not limited to, noisy environments can increase the error rates of even state of the art automated speech recognition systems, and these errors negatively affect the accuracy of SLU systems. Consequently, improvements to methods and systems that increase the accuracy of spoken language understanding systems would be beneficial.

SUMMARY

This disclosure describes a jointly trained model of intent detection and slot filling with consideration of speech recognition errors. The attention-based encoder-decoder recurrent neural network first decodes the intent information from an utterance, and then corrects errors in the word sequence, if any, before extracting the slot information. The triple joint training framework maximizes the probability of a correct understanding given an input utterance.

In one embodiment, a method for operation of a spoken language understanding (SLU) system has been developed. The method includes receiving, with a processor in the SLU system, a plurality of words in a text phrase, generating, with the processor, a first encoded representation of the plurality of words based on an output of a recurrent neural network (RNN) encoder using the plurality of words as inputs to the RNN encoder, generating, with the processor, an intent label corresponding to the plurality of words based on an output of a first RNN decoder using the first encoded representation as input to the first RNN decoder, generating, with the processor, a corrected plurality of words based on an output of a second RNN decoder using the first encoded representation and the intent label as inputs to the second RNN decoder, the corrected plurality of words including at least one word that is different than one of the plurality of words in the text phrase, generating, with the processor, a second encoded representation corresponding to the plurality of corrected words based on another output of the RNN encoder using the plurality of corrected words as inputs to the RNN encoder, and generating, with the processor, a machine-readable dialogue phrase that includes at least one word in the plurality of corrected words assigned to at least one slot in the machine-readable dialogue phrase based on an output of a third RNN decoder using the second encoded representation of the plurality of corrected words and the intent label as inputs to the third RNN decoder.

In another embodiment, a system for spoken language understanding (SLU) has been developed. The system includes a memory configured to store a recurrent neural network (RNN) encoder, a first RNN decoder, a second RNN decoder, and a third RNN decoder. The system further includes an input device and a processor operatively connected to the memory and the input device. The processor is configured to receive a plurality of words in a text phrase from the input device, generate a first encoded representation of the plurality of words based on an output of the RNN encoder using the plurality of words as inputs to the RNN encoder, generate an intent label corresponding to the plurality of words based on an output of the first RNN decoder using the first encoded representation as input to the first RNN decoder, generate a corrected plurality of words based on an output of the second RNN decoder using the first encoded representation and the intent label as inputs to the second RNN decoder, the corrected plurality of words including at least one word that is different than one of the plurality of words in the text phrase, generate a second encoded representation corresponding to the plurality of corrected words based on another output of the RNN encoder using the plurality of corrected words as inputs to the RNN encoder, and generate a machine-readable dialogue phrase that includes at least one word in the plurality of corrected words assigned to at least one slot in the machine-readable dialogue phrase based on an output of the third RNN decoder using the second encoded representation of the plurality of corrected words and the intent label as inputs to the third RNN decoder.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

As used herein, the term Recurrent Neural Network (RNN) refers to a type of neural network that receives a series of inputs and generates a series of outputs in which each input to the RNN affects the internal state of the RNN to provide the RNN with a "memory" in which the output of the RNN is affected not only by the present input but on the internal state of the RNN that has been changed based on previously received inputs. One type of RNN uses a Long Short-Term Memory (LSTM) unit, which is also referred to as a neuron in an RNN.

Figure 5:
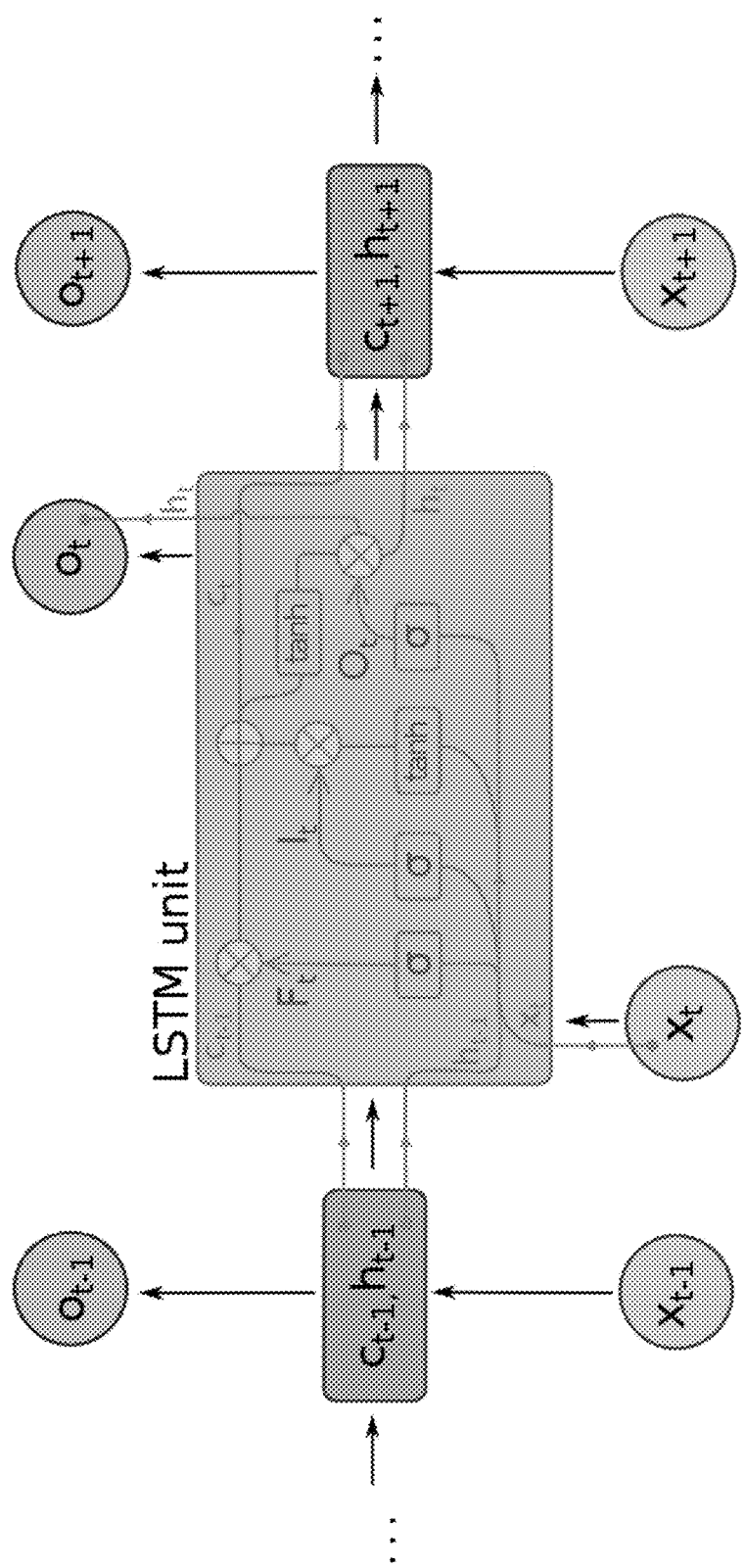
FIG. 5 is a diagram of a prior-art long short-term memory (LSTM) unit.

An example of a prior art LSTM is depicted in FIG. 5. FIG. 5 depicts the operation of the LSTM at a time step t with simplified depictions of the previous time step t−1 and the subsequent time step t+1. The LSTM in FIG. 5 receives an input value $x_t$, which is typically a numeric input value, and generates an output value $o_t$ based on the input value, an internal state of the LSTM that is referred to as a "hidden state", and context information that incorporates information received from prior operations of the LSTM unit on one or more of the earlier inputs. In the example of FIG. 5, the LSTM unit includes an inner state that is also referred to as a numeric "hidden state" variable $h_t$ where each input occurs at a discrete time step t. The hidden state $h_t$ is determined based on two inputs $c_{t-1}$ and $h_{t-1}$ from a prior time step, and the initial hidden state for the very first input is set to a predetermined value that is described in more detail below. The term c refers to a numeric "context" variable that is assigned to a numeric value that is generated in each iteration of the LSTM unit. In FIG. 5 the ⊕ sign refers to an addition unit that generates a sum of all inputs, the ⊗ sign refers to a multiplication unit that generates a product of all inputs, the term σ refers to a sigmoid function and the term tanh refers to the hyperbolic tangent function. Other embodiments of the LSTM unit that are depicted in FIG. 5 can use a somewhat different arrangement of the depicted elements. As depicted in FIG. 5, the context variable at time $c_t$ is determined based the prior context $c_{t-1}$, the input variable $x_t$, and the prior hidden state of the LSTM unit $h_{t-1}$. The hidden state $h_t$ is determined based on the prior hidden state $h_{t-1}$, the input variable $x_t$, and the current context $c_t$. In FIG. 5 the output $o_t$ is based on a hidden state value $h_t$. The present time context variable $c_t$ and the hidden state $h_t$ become inputs to the subsequent iteration of the LSTM unit at time t+1 to process another input value $x_{t+1}$. A series of one or more context variables that are generated over multiple time steps are referred to as a "context vector". While RNNs that use one or more LSTM units are referenced herein for illustrative purposes, other RNN embodiments that generate hidden state and context data are also suitable for use with the systems and methods described herein.

The embodiments described herein use both unidirectional and bidirectional RNNs. A unidirectional RNN incorporates an LSTM unit or other appropriate neuron to generate a series of outputs based on a series of input values going in one direction in time, which is usually although not exclusively from the earliest input in a sequence to the latest input in a sequence. The LSTM unit of FIG. 5 is shown in a unidirectional configuration in which earlier values in the input sequence x influence the state of the LSTM unit for later inputs. While some more complex RNNs use multiple layers of neurons, the unidirectional RNNs described herein use a single LSTM unit that is updated for each input in a series of inputs. A bidirectional RNN includes at least two neurons, such as two instances of the LSTM that is depicted in FIG. 5, to generate outputs going both forwards in time and backwards in time. For the embodiments described herein, all of the input data are available prior to using the RNNs so going "backwards" in time simply means that one LSTM unit starts from the final value in the input and iterates backwards to the first input value to incorporate hidden state and context information from future values in the sequence instead of previous values in the sequence, which is effectively the configuration of the LSTM of FIG. 5 that is reversed in time. The other LSTM unit generates an output starting from the earliest input in the sequence in a similar manner to the unidirectional LSTM. The output of the bidirectional LSTM is, for example, a set of two vectors that are based on the numeric hidden state variable outputs for both of the LSTM nodes to produce an output for an input value in the sequence that is influenced by both previous values and subsequent values in the sequence.

As used herein, the terms "intent" and "intent label" refer to a numeric identifier that associates a plurality of words in an input text phrase received from a user with a predetermined machine-readable dialogue phrase that is stored in a memory. The dialogue phrase encodes information about a task that the user wants to perform based on information in the original input from the user. For example, in a travel reservation system the intent can correspond to a request to book a flight, check the status of a flight, change a flight, ask for ticket price information, and other tasks that are supported by the system. As described in further detail below, a recurrent neural network encoder/decoder system and method generates the intent label based on an input text phrase that is received from a user, and uses another decoder to assign words from the input text phrase to slots that are present in the structure of the identified machine-readable dialogue phrase. Additionally, the embodiments described herein use the intent label as part of an input to a recurrent neural network word correction decoder that updates the original input text based on the identified intent label to correct errors in the input text and improve the accuracy of the spoken language understanding system.

As used herein, the term "slot" refers to a field in a predetermined, machine-readable dialogue phrase that maps a single word or small number of words in an input text to a variable that is understandable in an automated spoken language understanding dialogue framework. As described above, the machine-readable dialogue phrase corresponds to a task that an SLU system performs that the system identifies by detecting the intent of the input. Each slot represents a variable input field for a given task. For example, one intent corresponds to a task that commands the system to turn on a device. The task includes two slots, a first slot indicates the type of device to be activated (e.g. a heater) and the second slot includes a setting for the device (e.g. set the temperature to 40° C.). Each machine-readable dialogue phrase includes at least one slot and many machine-readable dialogue phrases include a sequence of multiple slots. As described in further detail below, a recurrent neural network encoder/decoder system identifies a particular machine-readable dialogue phrase that corresponds to a text input based on the identified intent and assigns words from a set of corrected input words to the slots to produce a machine-readable input. The slots are filled based both on the contents of words in the input text and based on the "alignment" or ordering of the words in the sequence. Additionally, in many instances some of the words from the input text phrase do not correspond to any slot are omitted from the final machine-readable dialogue phrase.

One example of a machine-readable dialogue phrase is formed from a sequence of two slots that are referred to herein as FromLoc and ToLoc. The machine-readable dialogue phrase is used in an airline flight reservation system to identify the origin (FromLoc) and destination (ToLoc) of a flight that is specified in user input. As described in further detail herein, a recurrent neural network encoder/decoder system identifies words in a corrected text input phrase that correspond to the origin slot FromLoc and the destination slot ToLoc. The words are identified using a recurrent neural network decoder that assigns words to the slots based not only on the content of the words, which are geographical locations for both of the slots, but on the alignment of the words in the text phrase to identify the correct origin location for FromLoc and destination location for ToLoc.

Figure 1:
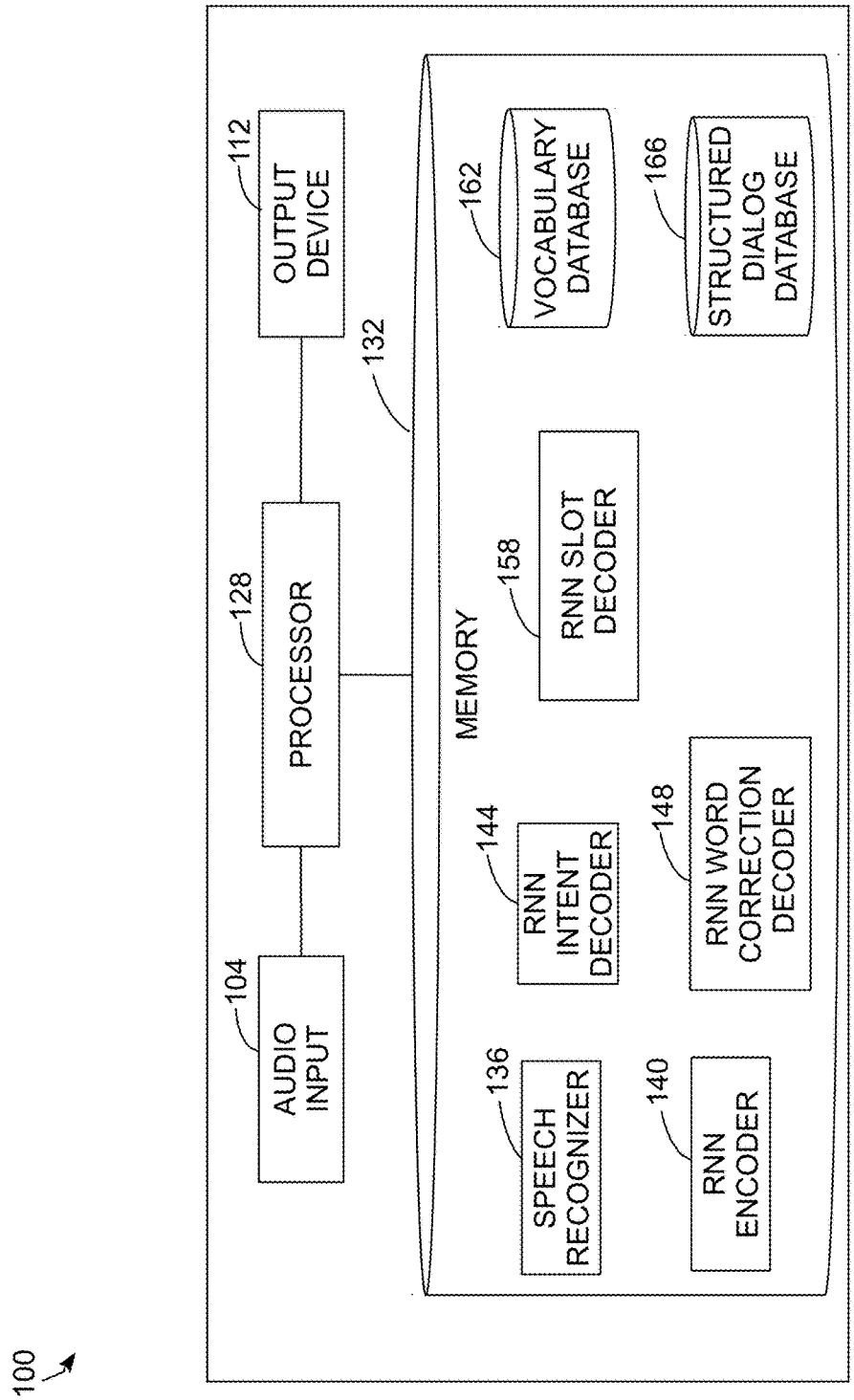
FIG. 1 is a schematic diagram of one embodiment of an automated spoken language understanding (SLU) system.

FIG. 1 depicts a spoken language understanding (SLU) system 100 that performs operations to map words in an input phrase received from a human user to a predetermined dialogue phrase that has a structure with slots that are filled by selected words that are provided in the input. The system 100 includes an audio input device 104, an output device 112, a processor 128, and a memory 132.

In the system 100, the audio input device 104 is, for example, a microphone or a series of microphones that receive spoken input from a human user. The audio input device 104 optionally includes additional circuits including filters, amplifiers, and analog-to-digital converters that produce a digitized representation of the input speech for additional processing by the processor 128. While FIG. 1 depicts an audio input device 104, alternative embodiments use another input device that enables the system 100 to receive a series of words corresponding to human input, such as a keyboard or gesture input device.

In the system 100, the output device 112 is, for example, an audio output device or visual display device that produces an output in a dialogue system. The output is based, at least in part, on information provided to the system 100 from the user via the audio input device 104. As described in more detail below, the system 100 receives speech or text input from a user, encodes the input, and generates both an intent label for the input as well as corrected input text based on the identified intent to generate a machine-readable dialogue phrase with slots that include words taken from the corrected input text. The system 100 processes the structured dialogue input text with particular terms that are understandable in a spoken language understanding framework to produce an output response based on the input from the user. The output device 112 provides an output to the user that mimics a dialogue response expected by the user based on the input from the user, but the system 100 generates the dialogue response in an automated manner.

In the system 100, the processor 128 is a digital logic device including, for example, one or more of a microprocessor central processing unit (CPU), microcontroller, digital signal processor (DSP), field programmable gate array (FPGA), graphical processing unit (GPU), application specific integrated circuit (ASIC), or any other suitable digital logic devices that perform the functions and actions of the system 100 that are described herein. In some embodiments, the processor 128 includes acceleration hardware that implements the operations of the RNN encoders and decoders described herein in an efficient manner, although other processing hardware including CPUs and GPUs can implement the RNN encoders and decoders as well. The processor 128 is operatively connected to the audio input device 104, the output device 112, and the memory 132.

In the system 100, the memory 132 includes one or more volatile memory devices such as random access memory (RAM) and one or more non-volatile memory devices such as a magnetic or solid state disk. The memory 132 stores programmed instructions that the processor 128 executes to perform the functions and actions described herein. In the system 100, the memory 132 stores programmed instructions and data that implement a speech recognizer 136, an RNN encoder 140, an RNN intent decoder 144, an RNN word correction decoder 148, an RNN slot decoder 158, a vocabulary database 162, and a structured dialogue database 166.

In the memory 132, the speech recognizer 136 is a prior-art automated speech recognition (ASR) system that includes, for example, software and models that convert the electrical signals that the system 100 receives from the audio input device 104 into a sequence of machine-readable representations of the spoken words. The speech recognizer includes any suitable embodiment of an automated speech recognition system including those using Hidden Markov Models, and various types of neural networks including "deep learning" neural network models. The system 100 uses the speech recognizer 136 to generate a sequence of text words that serve as a basis for the remainder of the spoken language understanding processing that is described herein. During operation, the speech recognizer 136 incorrectly recognizes some input words from the user due to numerous factors including the potential for acoustic noise and other distortions, the speech patterns of a particular user, and other errors that occur in even advanced embodiments of prior art speech recognizers. As described in more detail below, during a spoken language understanding process the system 100 improves the accuracy of intent detection and slot filling even when the inputs from the speech recognizer 136 include errors.

In the memory 132, the RNN encoder 140 is an RNN that receives a sequence of numeric values that correspond to words in an input text sequence and generates a first encoded representation of the plurality of words as a first vector of hidden state numeric output values $h^{enc}$ based on the inputs. In the embodiment of FIG. 1 the RNN encoder 140 is a bidirectional RNN encoder.

In the memory 132, the RNN intent decoder 144 generates an output "intent" label $y^{intent}$ in response to receiving the encoded output data from the RNN encoder 140. The RNN intent decoder 144 produces the intent label as a numeric value that maps the encoded output from the RNN encoder to a predetermined machine readable dialogue phrase that is selected from a plurality of dialogue phrases to have the greatest likelihood of being associated with the input text from the speech recognizer 136. In the embodiment of FIG. 1 the RNN intent decoder 144 is a unidirectional single-step RNN decoder that uses an attention mechanism to produce a single output label based on inputs received from the RNN encoder 140.

In the memory 132, the RNN word correction decoder 148 receives both the encoded outputs $h^{enc}$ from the RNN encoder 140 and the output label $y^{intent}$ from the RNN intent decoder 144 to generate a series of output words $y^{wcorrected}$ that include corrections to the initial input text from the speech recognizer 136. The intent information $y^{intent}$ provides additional context information to enable the RNN word correction decoder 148 to correct some of the original input text based on the identified intent for the phrase. In the embodiment of FIG. 1 the RNN word correction decoder 148 is a unidirectional RNN decoder that uses an attention mechanism.

In the memory 132, the RNN slot decoder 158 is another RNN decoder that fills a dialogue phrase having a predetermined structure formed from slots with words that are generated by the RNN word correction decoder 148. The output from the RNN slot decoder 158 is a machine-readable semantic structure that maps words from the user to machine-readable slots in a machine readable dialogue phrase that maps to the identified intent label described above. The system 100 or another automated spoken language system uses the machine-readable dialogue phrase with the filled slot structure as an input to provide further dialogue processing. In the embodiment of FIG. 1 the RNN slot decoder 158 is a unidirectional RNN decoder that uses an attention mechanism.

In the memory 132, the vocabulary database 162 stores a mapping between numerical values and words that are understood by humans. The vocabulary database assign numerical values with each value being encoded with a predetermined number of bits (e.g. 16 bits for a vocabulary with up to 65,536 words, 24 bits for a vocabulary with up to 16,777,216 words, etc.). During operation of the system 100, the RNN encoders and decoders receive the numerical inputs corresponding to human language words as inputs and the word correction RNN decoder 148 is configured to generate outputs that correspond to the probabilities of the most likely word or words in the vocabulary database that correspond to the output of the RNN decoder 148. The vocabulary database 162 is generated prior to a training process of the system 100 so each of the RNN encoders and decoders in the system 100 is trained using the number-word mapping in the vocabulary database 162, and the same vocabulary database 162 is used during inferencing operations in the system 100.

In the memory 132, the structured dialogue database 166 stores a mapping between the numerical values corresponding to intent labels and predetermined machine-readable dialogue phrases that each include one or more slots for the execution of specific tasks in a structured semantic framework. The structured dialogue database 166 is generated prior to a training process of the system 100 so each of the RNN encoders and decoders in the system 100 is trained using the intent label to machine-readable dialogue phrase mapping in the structured dialogue database 166, and the same structured dialogue database 166 is used during inferencing operations in the system 100.

Figure 4:
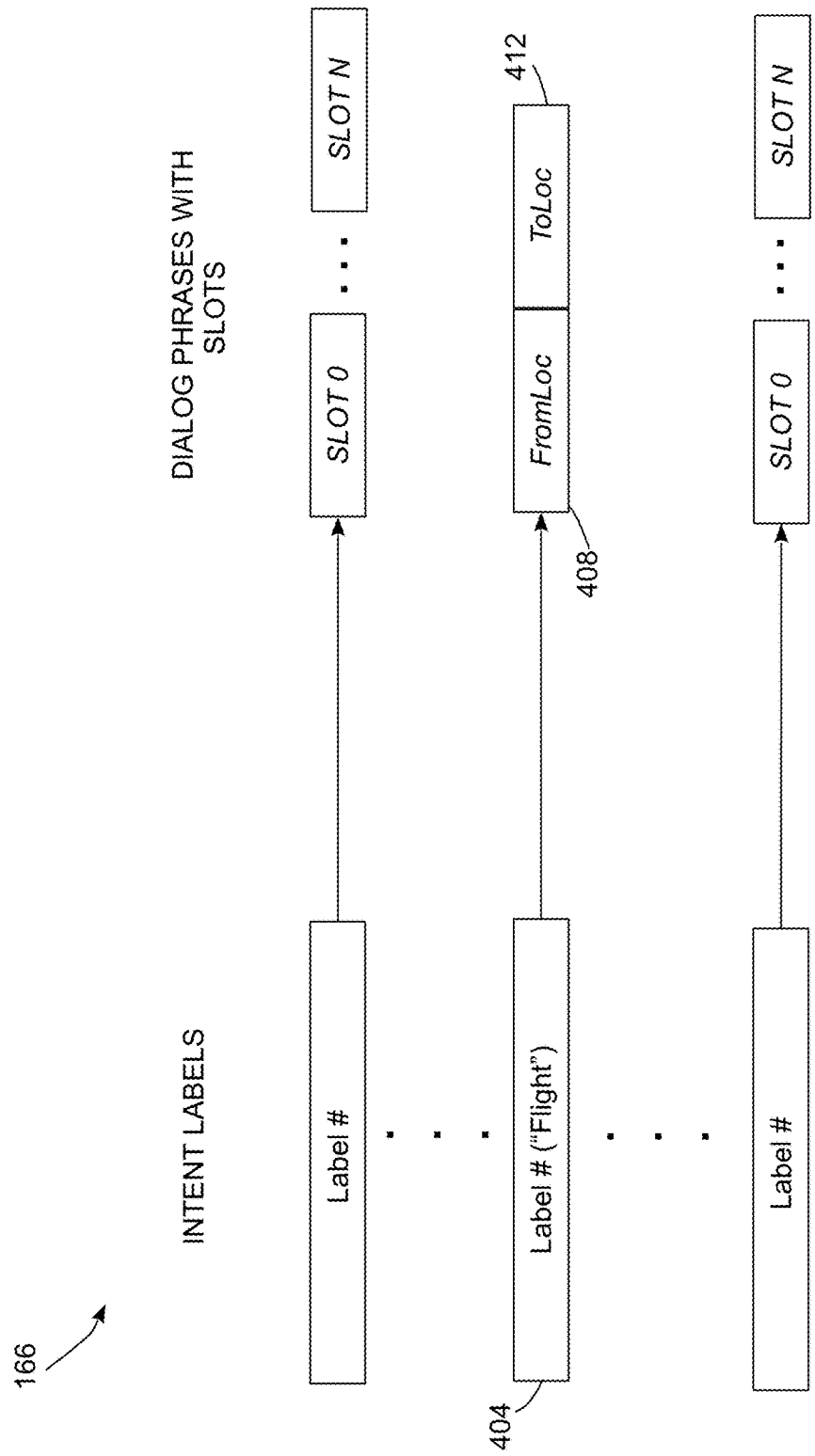
FIG. 4 is a diagram depicting intent identifiers that are mapped to predetermined machine-readable dialogue phrases in a database used in the system of FIG. 1.

FIG. 4 depicts an example of one embodiment of the structured dialogue database 166. In FIG. 4, each numeric intent label is associated with a machine-readable dialogue phrase structure. Each machine-readable dialogue phrase structure is formed from one or more predetermined slots that correspond to elements that are understood by a spoken language understanding framework. The system 100 identifies the intent label that corresponds to a particular machine-readable dialogue phrase and subsequently identifies words that correspond to each of the slots. In FIG. 4, the intent label 404 is a numeric value that maps to a predetermined machine-readable dialogue phrase used in an air travel scheduling system for a request to show flights from an origin location ("FromLoc") to a destination location of the flight ("ToLoc"). FIG. 4 depicts the slots 408 and 412 that correspond to these elements and the dialogue system fills the slots with information in the input from the user. While the slots 408 and 412 are shown in an order that matches one common pattern of speech for illustrative purposes (specifying the origin of a flight FromLoc prior to the destination ToLoc), the specific order of slots in FIG. 4 is arbitrary and the embodiments described herein can assign words to the slots in a different semantic order based on the input text (e.g. the system 100 can accurately assign slots to words in another input text phrase that specifies the destination ToLoc prior to the origin FromLoc). As described herein, the system 100 uses the RNN slot decoder 158 to associate words from a corrected input text phrase with the slots based on the contents of the words and based on the alignment of the slots, such as FromLoc occurring prior to ToLoc in the phrase sequence. As depicted in FIG. 4, in most embodiments the structured dialogue database 166 stores a plurality of mappings between intent values and different machine-readable dialogue phrases. Each of the machine-readable dialogue phrases includes at least one slot, and different dialogue phrases can include different numbers of slots based on the information that the SLU system extracts from each dialogue phrase.

While the system 100 depicts a single computing device that includes an audio input device 104, processor 128, and one or more output devices 112, alternative embodiments of the system 100 can include other hardware configurations that implement the structures and perform the methods described herein. In particular, in one embodiment a mobile electronic device such as a smartphone, portable computer, infotainment system that is integrated in a vehicle, wearable device, or other suitable device receives the audio input from an audio input device and optionally performs automated speech recognition. The mobile electronic device then transmits the results of the automated speech recognition via a data network to a network server that implements the additional processing of the input data from the speech recognizer to generate a structured output phrase with words from the speech recognition input being corrected and properly mapped to slots in a structured phrase. As such, references to the processor 128 are not strictly limited to the operation of a single physical processing device in a single computer, and also refer to the structure and operations of multiple individual processing devices that are incorporated in computing devices that are communicatively connected to one another.

Prior to operation of the system 100 that is described below in FIG. 2, the RNN encoder 140, RNN intent decoder 144, RNN word correction decoder 148, and the RNN slot decoder 158 undergo a joint training process that trains each of the RNN encoder 140 and the decoders 144-158 simultaneously to enable the system 100 to perform the spoken language understanding operations described below. In one embodiment, the system is trained using a large set of predetermined text phrases that have been previously determined to be relevant to the task of a specific spoken language understanding system.

In one example, the system 100 is configured to perform SLU operations for automated air travel reservations. A predetermined set of training data, such as the Airline Travel Information Systems (ATIS) data set provides predetermined text phrases and a correspond set of predetermined structured dialogue intents with slots that can be filled using selected words from the text phrases. The training process also introduces word errors into the training data to simulate the effects of inaccuracies in the output of the speech recognizer 136, which further enables proper training of the RNN word correction decoder 148 since some of the words of input text during the training process require correction. The result of the training process is a set of parameters that adjust the sigmoid functions of each of the LSTM units in the RNN encoder 140, RNN intent decoder 144, RNN word correction decoder 148, and the RNN slot decoder 158 to enable each of these RNNs to produce outputs that maximize the overall likelihood of generating a correct slot filled output based on the training data when the RNN encoder 140 and the RNN decoders 144, 148, and 158 are used together in the joint model that is described herein. Since the training data are selected to be representative of actual inputs that are expected to be received during operation of the system 100, the trained RNNs also have a high likelihood of producing accurate outputs when presented with another sequence of input text that is not directly present in the original training data during operation of the system 100. Additionally, the training process uses hyperparameters that are defined prior to commencement of the training process that define various parameters for training the RNN encoder and decoders including hyperparameters that specify a learning rate, minibatch size (used in minibatch gradient descent training processes that are otherwise known to the art), and dropout rate. One example of a sigmoid function with a numeric parameter a is $$\frac{1}{1+e^{-ax}}.$$

During the training process, the system 100 adjusts the parameters in each of the encoders and decoders to maximize the accuracy of performing the intent detection, word correction, and slot-filling operations described herein using a set of training data.

The training process is said to be a "joint" training process because during the training process the RNN encoder 140 generates the outputs that are received by the RNN decoders 144, 148, and 158 as inputs. During the training process, the parameters of the RNN encoder 140 and the RNN decoders 144, 148, and 158 are each adjusted to increase the total accuracy of operation of the entire system 100 as a whole ("jointly") instead of only training the RNN encoder 140 and the RNN decoders 144, 148, and 158 in isolation. In the system 100, the memory 132 stores the parameter data, weight matrices, and other data structures that implement the RNN encoder and RNN decoders in association with each of the RNN encoder 140, RNN intent decoder 144, RNN word correction decoder 148, and the RNN slot decoder 158 RNNs after the training process is completed to enable the inferencing operation of the process 200 that is described in more detail below.

While the training process is described in conjunction with the system 100 of FIG. 1, which is capable of performing the training process, for illustrative purposes, in other embodiments the computing devices that perform the training process are different than the computing devices that implement the inference process that is described below. For example, in one embodiment another computing system performs the training process and the system 100 receives and stores the jointly trained RNN encoder 140, RNN intent decoder 144, RNN word correction decoder 148, and the RNN slot decoder 158 in the memory 132.

Figure 2:
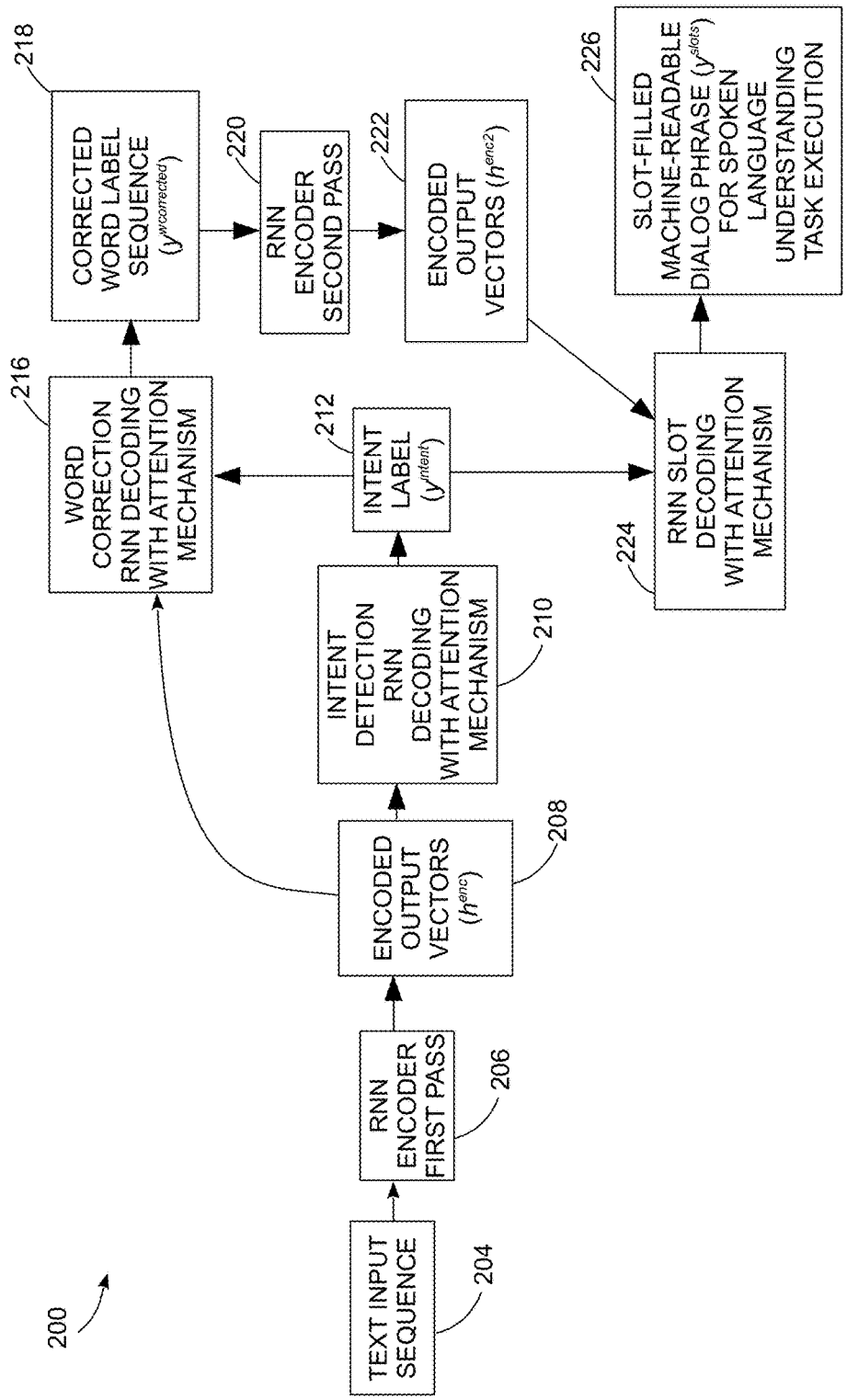
FIG. 2 is a block diagram of a process for automated intent detection, word correction, and generating of machine-readable dialogue phrases via a slot filling process.

FIG. 2 depicts a process 200 for operation of a spoken language understanding (SLU) system that processes the output of a speech recognizer to generate a structured phrase that can undergo additional automated processing in a human-machine dialogue system. The process 200 is also referred to as an inferencing process because the process 200 uses previously trained RNN encoders and decoders in the system 100 to detect and intent and generate a machine-readable dialogue phrase output with one or more slots that are filled based on a user input. In the description below, a reference to the process 200 performing a function or action refers to the operation of a processor to execute stored program instructions to perform the operation in conjunction with components in an automated spoken language understanding system. For example, the description below includes descriptions of the RNN encoders and RNN decoders that refer to operations performed by a processor to execute stored program instructions in conjunction with data structures of the RNN encoders and decoders that are stored in a memory to implement the RNN encoder or decoder. The process 200 is described in conjunction with the system 100 of FIG. 1 for illustrative purposes.

The process 200 begins as the system 100 receives an input sequence of words from a human user (block 204). In the system 100, the processor 128 uses the automated speech recognizer 136 to generate a sequence of words based on input that is received from the audio input device 104. In another embodiment, the input may be free-form text that the user enters with a keyboard or gesture input device. As described above, while the output of the automated speech recognition process can identify a sequence of words in a machine-readable format, the spoken language understanding system requires additional processing to map the words into a structured phrase that is amenable to additional automated processing. Additionally, even state of the art speech recognizers make errors in the generation of input words at a non-trivial rate, and the system 100 also provides additional error correction to correct words within the context of the spoken phrase to reduce the rate of errors in the SLU processing. An example input text sequence used in the description of the process 200 is: "show me flights from tampa to no walkie" where the input sequence includes an error in the input with the terms "no walkie" actually referring to the city name "Milwaukee".

The process 200 continues as the system 100 performs a first encoding pass using the RNN encoder 140 (block 206). The first encoding pass uses the words in the text as a sequence of inputs to the RNN encoder 140. In the system 100, the processor 128 uses the vocabulary database 162 to map each word of text to a predetermined numeric value that can serve as the input to the RNN encoder 140. Each numeric value corresponding to a word in the input sequence is referred to symbolically as $x_i$ for a total of I words in the input sequence, where of course different text input sequences can contain a variable number of words. Using the example above, the processor 128 uses the vocabulary database 162 to generate numeric input values for each of the words: $x_1$="show", $x_2$="me", $x_3$="flights", $x_4$="from", $x_5$="tampa", $x_6$="to", $x_7$="no", $x_8$="walkie". Each entry in the input sequence x is assumed to happen at a distinct time interval for purposes of the RNN decoder/encoders described herein, although the actual "time" here only refers to the sequence in which the words are spoken and does not refer to, for example, the absolute time that each word was spoken or the speed at which words are spoken.

During the process 200, the RNN encoder 140 generates the first encoded representation of the plurality of words in the text phrase as a first vector of encoded output data $h^{enc}$ (block 208). The encoded output data vector $h^{enc}$ is formed from the hidden state outputs from the RNN encoder 140 for each of the inputs, which includes eight elements corresponding to the plurality of words in the example provided above. The RNN encoder 140 receives the plurality of words in the input text and updates the LSTM units as each input word is applied as an input at each "time step" where the system 100 uses each word in the input as an input in a sequence where each word in the sequence corresponds to a discrete "time". As mentioned above, the RNN encoder 140 is a bidirectional RNN, which means that each entry in the hidden state output vector $h^{enc}$ is itself a two-element vector that includes the hidden state value for the forward time fh (earliest to latest) and backward time bh (latest to earliest) LSTM units. The final output of the forward time LSTM unit is a vector based on the hidden state of the forward time LSTM unit after processing each of the I plurality of words in the input phrase ($fh_{I-1}^{enc}$ for word indices 0 ... (I-1)) and similarly the final output of the backward time LSTM unit is another vector based on the hidden state of the backward time LSTM unit after processing each of the I plurality of words in the input phrase in reverse order ($bh_0^{enc}$ for word indices (I-1) ... 0). These final outputs from the LSTM cells incorporate information from each of the plurality of words in the text phrase in the final encoded output. The final encoded output $h^{enc}$ combines the output vectors for both the forward time and reverse time LSTM units: $h^{enc}=([fh_{I-1}^{enc}, bh_0^{enc}])$. Each output entry in the vectors of $h^{enc}$ is a numeric value that is typically a fraction in a range of 0.0 to 1.0. While not depicted in greater detail herein, in some embodiments a non-linear function q is applied to $fh_{I-1}^{enc}$ and $bh_0^{enc}$ to generate the final output vectors in $h^{enc}$. In some embodiments, the system 100 generates fixed-length output vectors for $h^{enc}$ that are not necessarily the same length as the number of words in the input vector, while in other embodiments the encoded vectors in $h^{enc}$ have a length that varies based on the length of the original input text.

The process 200 continues as the system 100 provides the encoded representation output vector $h^{enc}$ as an input to the RNN intent decoder 144 to generate an intent label based on the encoded input using an attention mechanism (block 210). In particular, the encoded output vector $h^{enc}$ is one input to the RNN intent decoder 144. The RNN intent decoder generates a single output label that identifies a predetermined "intent" of the input text from the user based on a set of predetermined "intents" that correspond to different structured phrases in the structured dialogue database 166.

The RNN intent decoder 144 produces only a single output label based on multiple input values in the encoded input vector $h^{enc}$ instead of producing a series of output hidden values, and the operation of the RNN intent decoder 144 is described in more detail below. Prior to receiving the first input, the processor 128 initializes the internal state of the RNN intent decoder to a state $s_0$ based on the following function: $s_0=\tanh(W_s[fh_I^{enc},bh_1^{enc}])$ where $fh_I^{enc}$ is the final value from the forward time hidden state output from the RNN encoder 140 and $bh_1^{enc}$ is the final value from the backward time hidden state output from the RNN encoder 140. The term $W_s$ is a weight matrix that is provided for the connection between each neuron. The current internal hidden state of the RNN intent decoder 144 starting from $s_0$ is referred to as $\bar{h}_{intent}$ and each update to the internal state that changes the current internal state is referred to as $\tilde{h}_{intent}$. The processor 128 performs each update based on the following function: $\tilde{h}_{intent}=\tanh(W_c[c_{intent},\bar{h}_{intent}])$ the newly generated hidden state $\tilde{h}_{intent}$ becomes the current hidden state $\bar{h}_{intent}$ for any additional inputs that are provided to the RNN intent decoder 144. The term $W_c$ is another weight matrix. The term $c_{intent}$ is the context value of the RNN intent decoder 144. Unlike a standard LSTM unit in an RNN, such as the LSTM unit of FIG. 5, the context value $c_{intent}$ is calculated using an attention mechanism that produces a numeric value $a_{ij}$ based on the following function that provides a summation of values for each $c_{intent}$ value that is generated for the I input elements of $$h^{enc}: c_{intent_i} = \sum_{j=1}^{I} a_{ij} h_j^{enc}.$$

To calculate each value of $a_{ij}$, the processor 128 uses the following function:

$$a_{ij} = \frac{e^{((\bar{h}_i^{intentT})(W_a)(h_j^{enc}))}}{\sum_{j'} e^{((\bar{h}_i^{intentT})(W_a)(h_{j'}^{enc}))}}.$$

In the preceding equation, the term j is an index value corresponding to an LSTM neuron layer, the "T" notation represents a transpose matrix for $\bar{h}_{intent}$, and the term $W_a$ represents another weight matrix that is used in the attention mechanism. The attention mechanism generates the values $a_{ij}$ that increase the accuracy of identifying the specific intent label that correctly corresponds to a specific machine-readable dialogue phrase based on the plurality of words in the input text by weighting the alignment of the words based on word position in the input text in addition to the specific contents of the words. As described above, the $a_{ij}$ affects the context value $c_{intent_i}$ to incorporate the alignment of words in the input into the operation of the RNN intent decoder 144. The slots in each machine-readable dialogue phrase correspond both to the semantic meaning of terms in the input text and to the position of the terms within the input relative to other words, which in the example described above enables the system 100 to distinguish between FromLoc and ToLoc in an input phrase even though both slots refer to semantically identical elements (i.e. both refer to a geographic location). Thus, the RNN intent decoder 144 identifies an intent label based both on the contents of the plurality of words in the input text phrase and the alignment of specific words in the sequence of the input text phrase.

Figure 3:
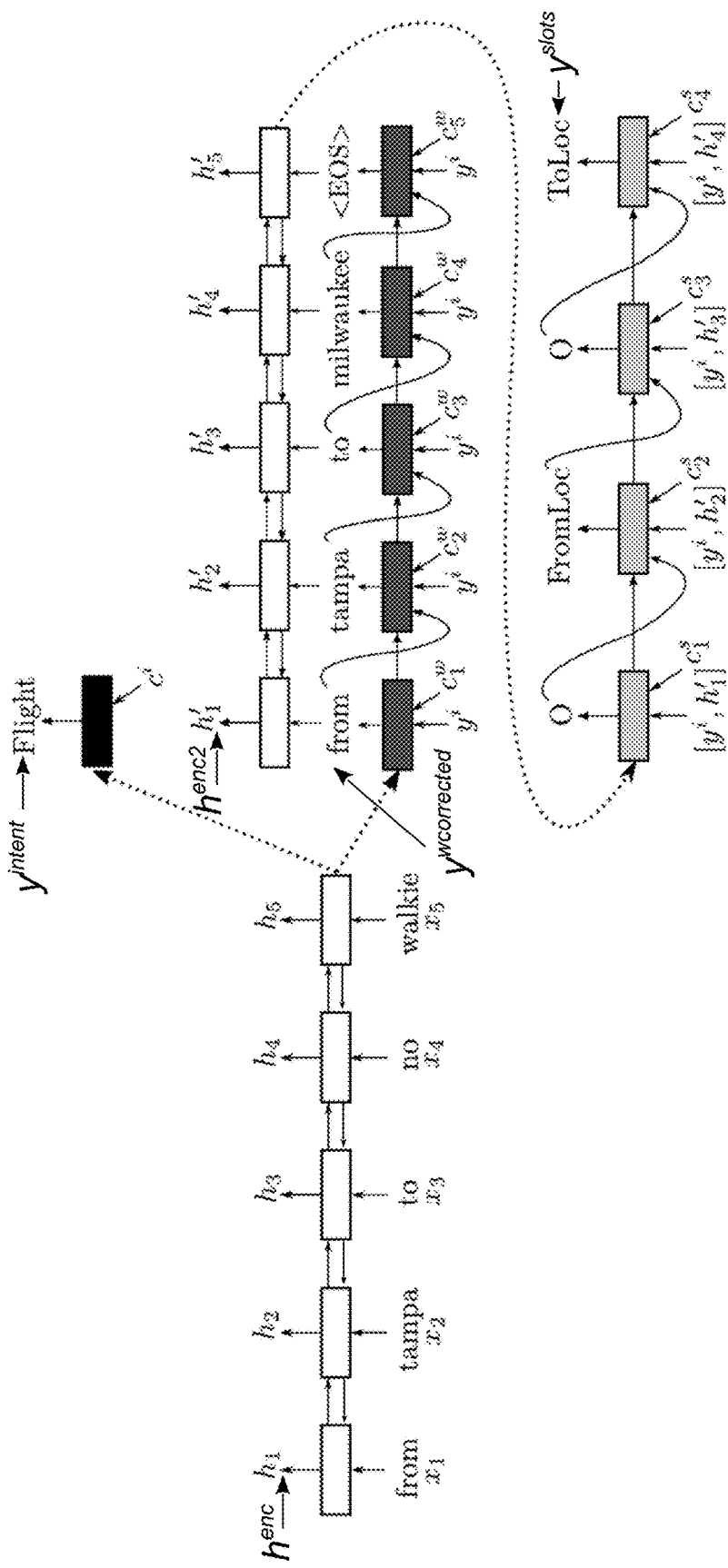
FIG. 3 is a diagram that depicts aspects of the operation of the method of FIG. 2.

The RNN intent decoder 144 processes the encoded input vectors $h^{enc}$ from the RNN encoder 140 to generate the final output hidden state $\tilde{h}^{intent}$. To generate a numeric intent label $y^{intent}$ for the identified intent (block 212), the processor 128 uses the following function to generate an output that most closely corresponds to an intent label that is stored in the structured dialogue database 166: $y^{intent}$=argmax(softmax$((W_p)(\tilde{h}_{intent}))$, where $W_p$ is a weight matrix and $\tilde{h}_{intent}$ is the final hidden state of the RNN intent decoder 144 after processing all of the inputs $h^{enc}$. FIG. 3 depicts a text intent label "Flight" that the RNN intent decoder 144 produces based on the encoded input of $h^{enc}$ for explanatory purposes, but in the practical embodiment of the system 100 the intent label is a numeric value that maps directly to a predetermined machine-readable dialogue within the structured dialogue database 166 as depicted in FIG. 4.

During the process 200, the intent label $y^{intent}$ acts as an input to both the RNN word correction decoder 148 and the RNN slot decoder 158. During the process 200, the RNN word correction decoder 148 receives the encoded output vectors $h^{enc}$ from the RNN encoder 140 and the single intent label $y^{intent}$ from the RNN intent decoder 144 as inputs, and generates a set of decoded outputs (block 216) that the processor 128 converts to a corrected word sequence $y^{wcorrected}$ (block 218). As described above, in many input phrases the speech recognizer 136 generates errors in the input text. During the process 200, the system 100 corrects some or all of these errors using the intent label as an additional input to the RNN word correction decoder 148. The intent label provides additional information to the RNN word correction decoder 148 to assist the RNN word correction decoder 148 in identifying an output word set that includes one or more corrections to some of the words in the original input text phrase. Additionally, the RNN word correction decoder 148 generates internal context values $c_{word\_correction}$ using the same attention mechanism that is used in the RNN intent decoder 144 to increase the accuracy of identifying words based on the expected alignment of words for the input intent label.

In more detail, the processor 128 initializes the internal state of the RNN word correction decoder 148 to an initial state $s_0$ prior to receiving the first element of $h^{enc}$ based on the following function: $s_0$=tanh($W_s[fh_T^{enc}, bh_1^{enc}]$) where $fh_T^{enc}$ is the final output vector from the forward time output from the RNN encoder 140 and $bh_1^{enc}$ is the final output vector from the backward time output from the RNN encoder 140. The term $W_s$ is a weight matrix that is used in the RNN word correction decoder 148. After receiving the initial input, the RNN word correction decoder 148 begins emitting words using the trained LSTM decoder that continues emitting a sequence of words until emitting an end of sentence ("EOS") term that indicates the output sequence is complete. Thus, the RNN word correction decoder 148 does not process the original words from the input on a word-by-word basis, but instead only uses the encoded inputs and the intent label $y^{intent}$ to initialize the state of the decoder, which then produces a sequence of corrected output words. The output hidden state value $\tilde{h}_{corrected\_word}$ of the RNN word correction decoder 148 maps to the numerical index value of a corresponding word in the vocabulary database 162 at each time step in a sequence of outputs from the RNN word correction decoder 148. In one embodiment, the processor 128 uses to following function to find the numeric index value for the next corrected output word: $y^{wcorrected}$=argmax(softmax$((W_p)(\tilde{h}_{corrected\_word}))$, where $W_p$ is a weight matrix. Each output word from the RNN word correction decoder 148 also updates the state of the LSTM unit for the next time step in the decoding process, so the RNN word correction decoder 148 selects corrected output words based not only on the next input in the encoded input sequence, but also based on the previously emitted corrected words.

As depicted in FIG. 3, the output of the word correction decoder 148 corrects input errors and generates a newly corrected set of input words with numeric values corresponding to $y_1$="show", $y_2$="me", $y_3$="flights", $y_4$="from", $y_5$="tampa", $y_6$="to", $y_7$="Milwaukee", and a final output of $y_8$=<EOS> that indicates an end to the output. The system 100 updates the state of the LSTM in the word correction decoder 148 at each time step for the output words $y_n$, and the output of the prior time steps are also referred to as "embedded" inputs since these outputs affect the internal state of the LSTM unit in the RNN corrected word decoder 148 as the RNN corrected word decoder 148 generates additional outputs. Additionally, as depicted in FIG. 3 the RNN word correction decoder 148 stops producing outputs when the next hidden state $\tilde{h}_{corrected\_word}$ maps to an end-of-sentence (<EOS>) output that signifies that there are no more words to be generated in the corrected word output sequence. Thus, the RNN word correction decoder 148 can generate an output plurality of corrected words $y^{wcorrected}$ that optionally includes a different number of words than are present in the original input text phrase.

The process 200 continues as the system 100 uses the plurality of corrected words as inputs to a second pass of the RNN encoder 140 (block 220) to produce a second encoded representation of the plurality of corrected words based on vectors of encoded hidden state data ea (block 222) that are based on the plurality of corrected words produced by the RNN word correction decoder 148. In the system 100, the processor 128 reuses the RNN encoder 140 to generate the second vector of encoded hidden state data $h^{enc2}$ in a similar manner to the generation of the first vector of encoded hidden state data $h^{enc}$ that is described above. The second vector of encoded hidden state data $h^{enc}$ is encoded based on the corrected word output $y^{wcorrected}$ to improve the accuracy of the final output of the contents in the slots of the machine-readable dialogue phrase.

The process 200 continues as the system 100 uses the second encoded representation of the plurality of corrected words $h^{enc2}$ and the intent label $y^{intent}$ as inputs to the RNN slot decoder 158 (block 224) to generate a machine-readable dialogue phrase $y^{slot}$ that includes at least one slot that is filled using at least one word from the plurality of corrected words (block 226). The RNN slot decoder 158 uses the same attention mechanism that is described above in conjunction with the RNN intent decoder 144 and the RNN word correction decoder 148. The RNN slot decoder 158 emits a series of output slot types based on the encoded input hence and the intent label $y^{intent}$. The RNN slot decoder 158 emits the slot identifiers in a sequence in a similar manner to the RNN corrected word decoder 148 that is described above. As depicted in FIG. 3, the slot FromLoc receives the value of "Tampa" and the slot ToLoc receives the value of "Milwaukee". The RNN slot decoder 158 emits the slot types in a similar manner to the RNN intent decoder 144 and the RNN corrected word decoder 148: $y^{slot}$=argmax(softmax$((W_p)(\tilde{h}_{slot}))$. Of course, the encoded hidden state vector $h^{enc2}$ also includes data corresponding to the words in the input phrase that do not directly map to the FromLoc and ToLoc slots. The RNN slot decoder 158 assigns each of the remaining words a default value, which is depicted as an "0"

in FIG. 3, that does not directly map to one of the predetermined slots in the machine-readable dialogue phrase that corresponds to the detected intent $y^{intent}$. As described above, each slot in the machine-readable dialogue phrase has a specific semantic meaning in the system 100, and the process 200 assigns a specific word, or in some instances multiple words where appropriate, of input to each slot to convert the human language text phrase from the input into a machine-readable format that can be understood by the automated system 100.

The system 100 uses the machine-readable dialogue phrase as an input to execute specific tasks in the field of human-machine interactions. In one non-limiting example of an output that the system 100 generates in response to generating the machine-readable dialogue phrase, the system 100 uses the filled-slot data the identified origin FromLoc="Tampa" and the identified destination ToLoc="Milwaukee" in the context of the identified intent to generate a database query using the structured query language (SQL) or another database query format to generate a list of flights between Tampa and Milwaukee based on information stored in a flight database (not shown). The system 100 then generates a visual or audible output using the output device 112 to present the list of flights to the user in response to the user query to perform the task that corresponds to the intent of the original input text phrase from the user. Of course, a wide range of other tasks can be implemented by computing systems that implement SLU with improved intent detection and slot filling accuracy using the embodiments described herein.

The process 200 described above enables the system 100 to perform SLU operations with greater accuracy for the identification of words that are assigned to specific slots in the machine-readable dialogue phrases compared to prior art solutions. Table 1 depicts improvements to the accuracy of the SLU operations in the context of the ATIS airline reservation system that is described above:

TABLE 1

| Model | WER (%) | Slot (F1) score | Intent Error (%) |
|---|---|---|---|
| 1. Intent detection & Slot Filling with High Error Rate Input | 14.55 | 84.26 | 5.8 |
| 2. Intent detection & Slot Filling with Reduced Error Rate Input | 10.43 | 86.85 | 5.2 |
| 3. Joint Intent Detection, Word Correction, & Slot Filling with High Error Rate Input | 10.55 | 87.13 | 5.04 |

In Table 1, WER corresponds to the word error rate percentage where lower values represent higher accuracy, the slot score represents a numeric score for how accurately the final slots in the output dialogue are filled with words from the input where higher values represent higher accuracy, and the intent error percentage represents the error rate in identification of the correct intent, where lower values represent higher accuracy. Table 1 depicts three implementations 1-3 in the three rows of the table. In implementation 1, the WER represents a high error rate from the ASR of human voice input, which may occur in noisy situations. The high WER of the input text in implementation 1 reduces the accuracy of slot filling and intent detection. Implementation 2 depicts a situation in which a separate speech recognition correction process reduces the WER of the inputs to a system that only implements intent detection and slot filling but does not include a jointly trained word correction RNN decoder that corrects the words of the original input based on the intent and the encoded representation of the words. Implementation 3 depicts an embodiment of the system 100 and the process 200 described above in which the original input from the ASR is noisy, as in implementation 1, but the final WER rate is reduced due to the text correction process of the RNN word correction decoder 148 that is trained jointly with the RNN encoder 140, the RNN intent decoder 144 and the RNN slot decoder 158 that are described above. In implementation 3, the slot filing score and the intent error scores exceed the accuracy of implementation 2 even though implementation 3 receives inputs with the higher WER of implementation 1. As depicted above, one non-limiting example of an improvement in the system 100 and the process 200 is that the accuracy of detecting the correct intent and filling the slots with the correct words from the inputs improves even in the presence of higher error rates in the input text from the speech recognizer 136.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operation of a spoken language understanding (SLU) system comprising:
   receiving, with a processor in the SLU system, a plurality of words in a text phrase;
   generating, with the processor, a first encoded representation of the plurality of words based on an output of a recurrent neural network (RNN) encoder using the plurality of words as inputs to the RNN encoder;
   generating, with the processor, an intent label corresponding to the plurality of words based on an output of a first RNN decoder using the first encoded representation as input to the first RNN decoder;
   generating, with the processor, a corrected plurality of words based on an output of a second RNN decoder using the first encoded representation and the intent label as inputs to the second RNN decoder, the corrected plurality of words including at least one word that is different than one of the plurality of words in the text phrase;
   generating, with the processor, a second encoded representation corresponding to the plurality of corrected words based on another output of the RNN encoder using the plurality of corrected words as inputs to the RNN encoder; and
   generating, with the processor, a machine-readable dialogue phrase that includes at least one word in the plurality of corrected words assigned to at least one slot in the machine-readable dialogue phrase based on an output of a third RNN decoder using the second encoded representation of the plurality of corrected words and the intent label as inputs to the third RNN decoder.

2. The method of claim 1, further comprising:
   receiving, with an audio input device, a spoken input phrase; and generating, with the processor, the plurality of words in the text phrase using automated speech recognition based on the spoken input phrase.

3. The method of claim 1, wherein the RNN encoder generates the first encoded representation corresponding to the plurality of words in the text phrase based on a first vector of hidden states generated in the RNN encoder.

4. The method of claim 3, wherein the RNN encoder generates the second encoded representation corresponding to the plurality of corrected words based on a second vector of hidden states generated in the RNN encoder.

5. The method of claim 1, further comprising:
identifying, with the processor, the machine-readable dialogue phrase in a database stored in a memory based on the intent label.

6. The method of claim 1, wherein the processor implements the RNN encoder as a bidirectional RNN, the first RNN decoder as a unidirectional RNN, the second RNN decoder as another unidirectional RNN, and the third RNN decoder as another unidirectional RNN.

7. The method of claim 6, wherein the processor implements the first RNN decoder including an attention mechanism to update a context of the RNN decoder during generation of the output of the first RNN decoder.

8. The method of claim 1 further comprising:
generating, with an output device in the SLU system, an output in response to the machine-readable dialogue phrase including the at least one word in the plurality of corrected words assigned to the at least one slot.

9. A system for spoken language understanding (SLU) comprising:
a memory configured to store:
a recurrent neural network (RNN) encoder;
a first RNN decoder;
a second RNN decoder; and
a third RNN decoder;
an input device; and
a processor operatively connected to the memory and the input device, the processor being configured to:
receive a plurality of words in a text phrase from the input device;
generate a first encoded representation of the plurality of words based on an output of the RNN encoder using the plurality of words as inputs to the RNN encoder;
generate an intent label corresponding to the plurality of words based on an output of the first RNN decoder using the first encoded representation as input to the first RNN decoder;
generate a corrected plurality of words based on an output of the second RNN decoder using the first encoded representation and the intent label as inputs to the second RNN decoder, the corrected plurality of words including at least one word that is different than one of the plurality of words in the text phrase;
generate a second encoded representation corresponding to the plurality of corrected words based on another output of the RNN encoder using the plurality of corrected words as inputs to the RNN encoder; and
generate a machine-readable dialogue phrase that includes at least one word in the plurality of corrected words assigned to at least one slot in the machine-readable dialogue phrase based on an output of the third RNN decoder using the second encoded representation of the plurality of corrected words and the intent label as inputs to the third RNN decoder.

10. The system of claim 9 wherein the input device is an audio input device and the processor is further configured to:
receive a spoken input phrase with the audio input device; and
generate the plurality of words in the text phrase using automated speech recognition based on the spoken input phrase.

11. The system of claim 9, wherein the RNN encoder generates the first encoded representation corresponding to the plurality of words in the text phrase based on a first vector of hidden states generated in the RNN encoder.

12. The system of claim 11, wherein the RNN encoder generates the second encoded representation corresponding to the plurality of corrected words based on a second vector of hidden states generated in the RNN encoder.

13. The system of claim 9, the memory being further configured to store:
a database that stores an association between a plurality of intent labels and a plurality of machine-readable dialogue phrases; and
the processor being further configured to:
identify the machine-readable dialogue phrase in the database based on the intent label that is generated based on an output of the first RNN decoder.

14. The system of claim 9, wherein the memory stores the RNN encoder as a bidirectional RNN, the first RNN decoder as a unidirectional RNN, the second RNN decoder as another unidirectional RNN, and the third RNN decoder as another unidirectional RNN.

15. The system of claim 14, wherein the memory stores the first RNN decoder including an attention mechanism to update a context of the RNN decoder during generation of the output of the first RNN decoder.

16. The system of claim 9, further comprising:
an output device; and
the processor being operatively connected to the output device and further configured to:
generate an output with the output device in response to the machine-readable dialogue phrase including the at least one word in the plurality of corrected words assigned to the at least one slot.

* * * * *